United States Patent [19]
Eckardt

[11] 3,947,177
[45] Mar. 30, 1976

[54] APPARATUS FOR INJECTION MOLDING OF MULTI-LAYER BODIES OF THERMOPLASTIC

[75] Inventor: Helmut Eckardt, Hilchenbach-Dahlbruch, Germany

[73] Assignee: Schloemann-Siemag Aktiengesellschaft, Dusseldorf, Germany

[22] Filed: Sept. 6, 1974

[21] Appl. No.: 503,653

[30] Foreign Application Priority Data
Sept. 13, 1973 Germany............................ 2346135

[52] U.S. Cl............. 425/130; 425/244; 425/245 R; 425/817 R; 425/DIG. 224
[51] Int. Cl.² ............................................ B29F 1/12
[58] Field of Search .... 425/4 R, 817 R, 4 C, 817 C, 425/130, 131.1, 132, 133.1, 133.5, 244, 245, 145, DIG. 224, DIG. 225, DIG. 227; 222/566; 264/45.4

[56] References Cited
UNITED STATES PATENTS

| | | | |
|---|---|---|---|
| 1,859,901 | 5/1932 | Trebes | 425/130 X |
| 3,070,126 | 12/1962 | Schneider | 425/DIG. 224 |
| 3,222,722 | 12/1965 | Reifenhauser | 425/133.1 X |
| 3,241,503 | 3/1966 | Schafer | 425/133.1 X |
| 3,479,422 | 11/1969 | Zavasnik | 425/4 C X |
| 3,778,209 | 12/1973 | Wallace et al. | 425/132 X |
| 3,894,823 | 7/1975 | Hanning | 425/245 R X |

Primary Examiner—R. Spencer Annear
Assistant Examiner—Mark Rosenbaum
Attorney, Agent, or Firm—Norman S. Blodgett; Gerry A. Blodgett

[57] ABSTRACT

Method and apparatus for the intermittent manufacture of multi-layer molded bodies of thermoplastic material with a foamed core and an unfoamed shell, wherein a strand of a nonfoaming plastic of ring-shaped cross-section enclosing a strand of plastic containing a foaming agent is injected into a mold.

2 Claims, 11 Drawing Figures

APPARATUS FOR INJECTION MOLDING OF MULTI-LAYER BODIES OF THERMOPLASTIC

BACKGROUND OF THE INVENTION

German Pat. No. DT-AS 1,778,451 teaches the manufacture of multi-layer molded bodies with a foamed core and an unfoamed thermoplastic shell, wherein there is first injected into the mold a plug of a first charge of unfoamable thermoplastic material, which does not fill the mold. Then, before solidification of the mid-section of this plug of the first charge, there is injected into this mid-section a charge of thermoplastic material containing a foaming agent, whereby the material of the second charge presses the material of the first charge in every direction in the mold, so that it becomes fully filled. In this known method, the second charge is fed only when the input of the first charge has been interrupted or fully terminated. This frequently leads to undesirable markings at the surface of the finished molded bodies. Furthermore, particularly on molded bodies of complex shape or complex surface, the first-injected charge sometimes is not pressed uniformly against the walls of the mold by the subsequent second charge containing a raising agent, but is dispersed so far apart that it ruptures. As a result, the smooth surface of the shell is broken up and the molded body becomes useless.

German Pat. No. DT-OS 2,241,002 teaches further a method for the injection molding of plastic bodies with smooth surface and porous core, wherein subsequent to the injection of the portion part of the plastic that forms the smooth surface there is injected a plastic containing a foaming agent simultaneously with an additional portion of the plastic that forms the smooth surface. The plastic containing the foaming agent flows into the mold through a central nozzle, while the plastic which forms the smooth surface enters the mold through a ring nozzle, that encircles the central nozzle. In this method only a small amount of the plastic which forms the smooth surface can still reach (during the simultaneous injection phase of the two different plastics) that part of the mold wall which lies opposite the sprue. Therefore, at this site of the finished molded body (which most of the time forms the so-called "visual" side) the shell of plastic which forms the smooth surface is relatively thin and sometimes even tears. This shell is, however, unnecessarily thick at the site of the finished mold, which is adjacent to the sprue. It is not possible by this method to control in any economically-justifiable manner the thickness of the smooth-surfaced shell in the region of the visual side of the finished molded body. These and other difficulties experienced with the prior art devices have been obviated in a novel manner by the present invention.

It is, therefore, an outstanding object of the invention to provide a method and apparatus for the intermittent manufacture of multi-layer molded bodies of thermoplastic material with a foamed core and an unfoamed shell, whereby it is assured (without increasing the amount of plastic that forms the unfoamed shell) that the unfoamed shell is approximately uniformly thick over the whole surface of the finished molded component and is, above all, absolutely compact.

With these and other objects in view, as will be apparent to those skilled in the art, the invention resides in the combination of parts set forth in the specification and covered by the claims appended hereto.

SUMMARY OF THE INVENTION

In general, to accomplish this task, it is proposed in the method described above in accordance with the present invention that the strand of plastic that contains a foaming agent is injected into the mold along with a core of nonfoaming plastic. This core, consisting of nonfoaming plastic, always arrives, during the injection process, at the surface of the mold that lies opposite to the sprue. In that way it can be assured, on the one hand, that the unfoamed shell will be without interruption on the visual face of the finished molded body. On the other hand, however, this method allows the thickness of the unfoamed shell to be controlled in a simple manner in the region of the visual surface of the molded body as well as also in the region of the surface lying opposite the visual surface.

More specifically, three strands of plastic material are injected into the mold either with equal or with unequal velocity and this is accomplished through an appropriate actuation of the delivery pistons in the injection cylinders. In this way it is possible to adapt the thickness of the shell to the demands required in the individual regions of the molded component. The nonfoaming, ring-shaped strand of plastic and the nonfoaming plastic core are composed either of the same or of a different material.

Apparatus for the intermittent manufacture of multi-layer molded bodies of thermoplastic material, particularly for the performance of this method, consisting of an injection head connected to at least two separate injection cylinders and of an outer ring nozzle and a central nozzle, it is proposed that between the outer ring nozzle and the central nozzle is arranged at least one other ring nozzle. This arrangement of the nozzles ensures that the tubular strand of plastic containing foaming agent as well as the tubular strand of nonfoaming plastic display a completely closed cross-section. The ring nozzles and the central nozzle are arranged concentrically of one another.

With closed nozzles to avoid any possibility that the individual plastics flow into another inside the injection head, it is proposed that the outer ring nozzle be limited by the injection head, and that an outer sleeve that seals the outer ring nozzle is axially-slidably guided in the injection head. The inner ring nozzle is formed by the outer sleeve and an inner sleeve that is axially slidable in the outer sleeve and that seals the inner ring nozzle. The bore of the inner sleeve forms the central nozzle and is equipped with a slidable closing pin. To be able to open and to close the two ring nozzles and the central nozzle independently of one another, separate slide drives are assigned to the two sleeves and the closing pin. For the simultaneous opening of all nozzles it is possible to use only one joint slide drive for all nozzles. The slide drives for the sleeves and the closing pin are controlled in accordance with the position of the pistons in the injection cylinders and this depends on the amounts of ejected plastics. The stroke of the slide drives is adjustable to permit modification of the discharge cross-section of the individual nozzles.

BRIEF DESCRIPTION OF THE DRAWINGS the character of the invention, however, may be best understood by reference to one of its structural forms, as illustrated by the accompanying drawings, in which:

FIG. 1 is a longitudinal sectional view of an injection head of apparatus constructed in accordance with the invention with a closed central nozzle and closed ring nozzles, FIG. 2 is a view similar to that of FIG. 1 but with an open central nozzle and with one open ring nozzle, FIG. 3 is a view similar to that of FIG. 1, where all the nozzles are open, FIG. 4 is a view similar to that of FIG. 1 with one open ring nozzle, and FIG. 5–11 are schematic views showing different phases of the injection of the plastics into a mold.

DESCRIPTION OF THE PREFERRED EMBODIMENT

Figure 1:
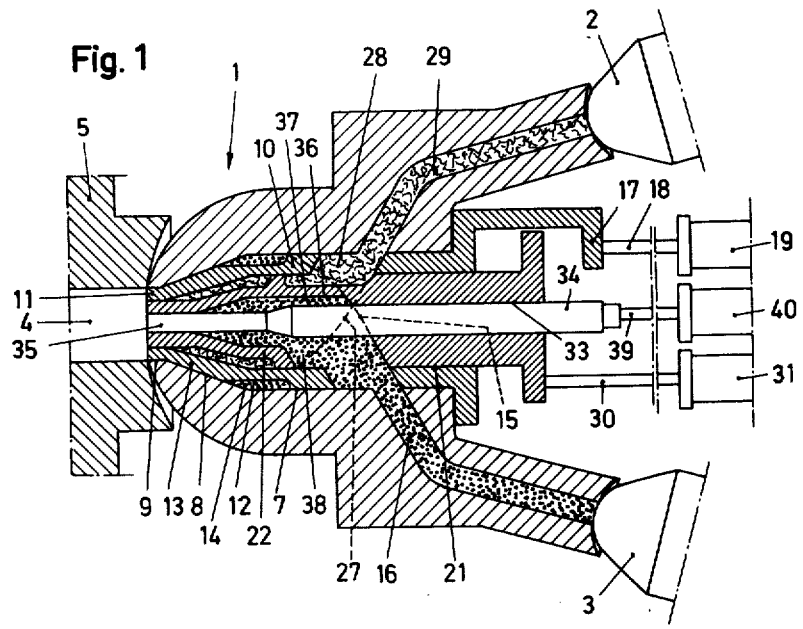
Figure 2:
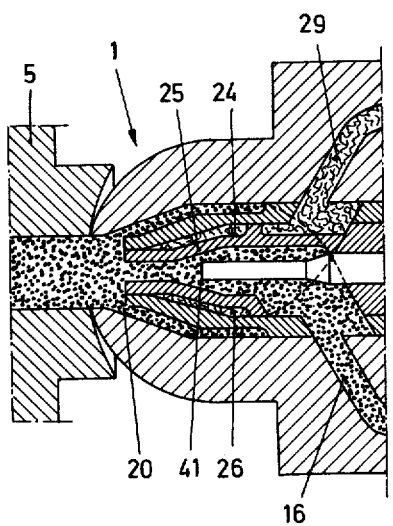
Figure 3:
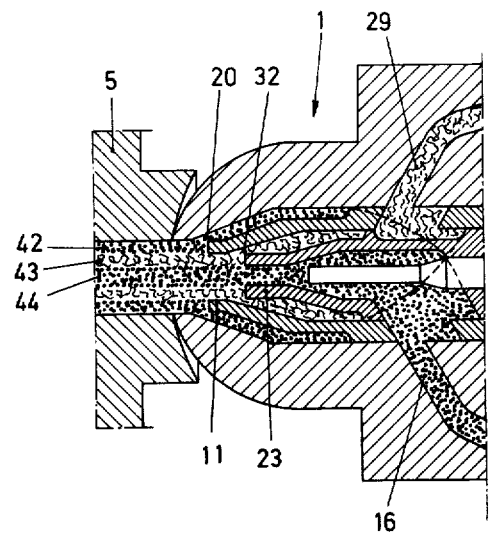

FIGS. 1–4 of the drawing show an injection head of an apparatus for the intermittent manufacture of multilayer molded bodies of thermoplastics, to which there are connected in this exemplified embodiment two injection cylinders 2, 3 of known construction. The injection head 1 presses on a mold 5 in the region of a sprue runner 4. The mold has (as shown in FIGS. 5–11) a simply shaped cavity 6 for the manufacture of a multi-layer molded body. The injection head 1 is provided with a central opening 7, which has a cylindric shape which remains constant over a great part of its length and which near the sprue runner 4 of mold 5 passes into a narrowing cone 8, followed by a short cylindric aperture portion 9. In the opening 7 of the injection head there is supported, so as to be axially slidable, an outer sleeve 10, which has (at the end that faces toward the sprue runner 4) an offset 11, the external diameter of which exactly corresponds to the inside diameter of the cylindric aperture part 9 of injection head 1. At some distance from this offset 11, the outer sleeve 10 has a constriction 12, which merges with the offset 11 by way of the conical part 13. By means of this constriction 12 at the outer sleeve 10, there is created an annulus 14 between the inside wall of opening 7 and the outer sleeve 10. To the annulus 14 is connected a channel 15, developed as a so-called cardioid, which is formed in the outer surface of the outer sleeve 10. The injection head 1 is provided with a channel 16, which connects the channel 15 of the outer sleeve 10 with the injection cylinder 3. In this exemplified embodiment the outer sleeve 10 has an arm 17 which engages the piston rod 18 of a conventional hydraulically-acutated piston-cylinder unit 19. By means of this piston-cylinder unit 19 the outer sleeve 10 may be shifted from its position of FIG. 1 (the so-called "closed" position) into the position shown in FIG. 2 (the "open" position). In this position the outer sleeve 10 frees an outer ring nozzle 20, which is limited by the injection head 1 and the outer sleeve 10.

Axially-slidably supported in a bore 21 of outer sleeve 10 is an inner sleeve 22, which is provided with a cylindrical offset 23 at its end that faces toward the sprue runner 4. The external diameter of this cylindric offset 23 is equal to the inside diameter of the offset 11 of outer sleeve 10. At some distance from this cylindric offset 23 the inner sleeve 22 likewise is provided with a constriction 24, which is connected with the cylindric offset 23 by a conical part 25. This constriction 24 creates between the inner sleeve 22 and the outer sleeve 10 an annulus 26 to which is likewise connected a channel 27 that is developed as a cardioid. The channel 27 (and thus the annulus 26) is in communication with the injection cylinder 2 through a recess 28 in outer sleeve 10 and a channel 29 in injection head 1.

The inner sleeve 22 engages a piston 30 of an hydraulically-actuated piston-cylinder unit 31, which is rigidly braced against the injection head 1. By means of this piston-cylinder unit 31, the inner sleeve 22 may be shifted from the position shown in FIG. 1 (the closed position) into the position shown in FIG. 2, and from there into the position shown in FIG. 3, (the open position). In the open position the inner sleeve 22 frees an inner ring nozzle 32 that is limited by the outer sleeve 10 and the inner sleeve 22.

Guided so as to be axially slidable in a bore of the inner sleeve 22 is a closing pin 34, which is provided at its end that faces toward the sprue runner 4 with an offset, cylindric journal 35, the external diameter of which is equal to the inside diameter of the cylindric offset 23 of the inner sleeve 22. Formed in the inner sleeve 22 is a rotary groove 36 by which an annulus 37 is formed between the closing pin 34 and the inner sleeve 22. To this annulus 37 is connected a channel 38 which opens in the illustrated embodiment into the channel 15 of the outer sleeve 10. Thus, it is also connected by the channel 16 in the injection head 1 to the injection cylinder 3. Also at the closing pin 34 is connected a piston 30 of a piston-cylinder unit 40, which is affixed to the injection head 1. By means of this piston-cylinder unit 40 the closing pin 34 may be shifted from its closed position (as shown in FIG. 1) stepwise, first into the closed position of FIG. 4, and then into the open position shown in FIG. 3. In this last position the closing pin 34 frees the central nozzle 41 which is formed by the discharge point of the inner sleeve 22.

Figure 5:
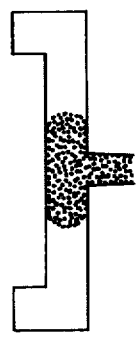

In the manufacture of a multi-layer molded body of thermoplastic material with a foamed core and an unfoamed shell the apparatus starts with a closed outer sleeve 10, closed inner sleeve 22, and a closed closing pin 34 in accordance with FIG. 1 of the drawing. Into the injection cylinder is measured a smooth-surface-forming, that is, a nonfoaming plastic material and into the injection cylinder 2 is measured plastic material containing a foaming agent, that is a plastic material which foams when pressure is released. As soon as the two injection cylinders 2, 3 are loaded, the piston-cylinder units 19, 31, 40 are energized in such a manner that the outer sleeve 10, the inner sleeve 22, and the closing pin 34 are moved into the positions shown in FIG. 2. In this position the outer ring nozzle 20 and the central nozzle 41 are open, so that, upon displacement of the injection piston in the injection cylinder 3, the nonfoaming plastic material, which forms the smooth shell, may flow through the outer ring nozzle 20 and the central nozzle 41 from the injection cylinder 3 into the sprue runner 4 and thus into the cavity 6 of mold 5 (FIG. 5).

Figure 6:
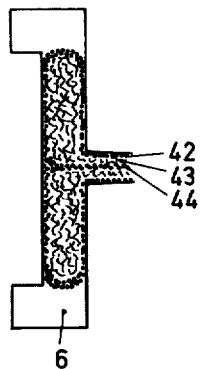

As soon as the conventional discharge point of the injection cylinder 3 has covered a specified path and a partial amount of the smooth-surface-forming plastic material is accumulated in the cavity 6 of the mold 5, then the piston of injection cylinder 3 actuates in known manner a circuit parameter, such as a cam, not shown, which causes energization of the piston-cylinder unit 31 and, thus, an opening of the ring nozzle 32. Through the channel 29 in the injection head 1, the channel 27 and the annulus 26 there is now pressed the plastic material containing foaming agent from the injection cylinder 2 through the inner ring nozzle 32 into the cavity 6 of the mold 5. The emptying of the injection cylinder 3 is not interrupted, so that there may simultaneously flow a tubular strand 42 of a nonfoaming plastic, a tubular strand 43 of a plastic-containing-foaming agent and a central strand 44 of a similar nonfoaming plastic through the sprue runner 4 into the cavity 6 of the mold (FIG. 6). The velocities of flow, or the amounts of the plastics strands 42, 43, 44 arriving per unit of time at the cavity 6 may be identical or different and may be controlled depending on the type of molded bodies to be made through an appropriate energization of the discharge pistons in the injection cylinders 2, 3.

Figure 7:

As soon as a sufficient amount of nonfoaming plastic and of the plastic containing foaming agent has accumulated in the cavity 6, all nozzles 20, 32, 41 are closed. The only pressure against the plastic containing foaming agent in the cavity 6 of the mold 5 is the pressure of the escaping air, so that the foaming agent, which finely dispersed in the plastic material, may expand. This causes an apparent expansion of the plasticized mass of plastic material and, thus, a filling of the cavity 6 in the mold 5 (FIG. 7).

Figure 4:
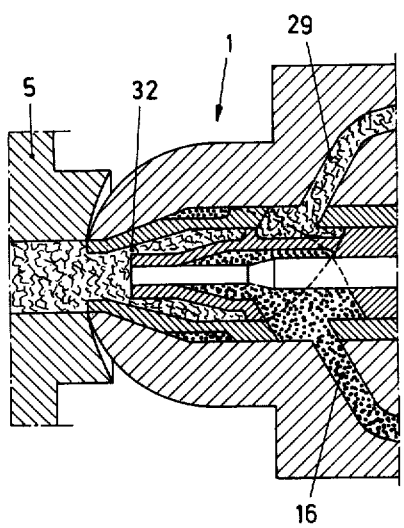

The nonfoaming plastic that flows into the cavity 6 through the outer ring nozzle 20 forms a compact layer at the surface of the cavity 6 adjacent the sprue runner 4, while the similar nonfoaming plastic arriving in the cavity 6 through the central nozzle 42 is deflected at the surface of cavity 7 that lies opposite to the sprue runner 4 and forms a compact layer there. The compact layer of nonfoaming plastic material extends to the lateral surfaces of the cavity 6 and this can be controlled in a simple manner through the amount of nonfoaming plastic that is delivered. In doing this, the thickness of this layer of nonfoaming plastic can be controlled in a simple manner. After the expiration of the periods of reaction and cooling, the finished molded body is removed in the known manner through the opening of the mold 5 and the operation described hereabove is then repeated. In a modified form of the illustrated embodiment described above, it is possible to allow only a flow of plastic containing the foaming agent cavity 6 during a certain period of time. For this purpose the outer ring nozzle 20 and the central nozzle 41 are closed, as is illustrated in FIG. 4.

Figure 8:
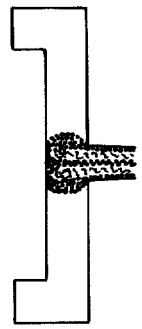
Figure 9:
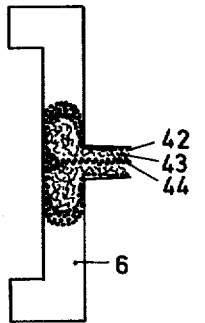
Figure 10:
Figure 11:
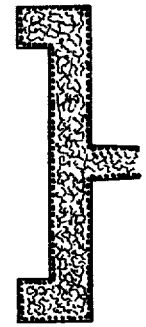

It is also possible to open all nozzles 20, 32, 41, simultaneously, so that the nonfoaming plastic strands 42 and 44 and the plastic strands 43 containing the foaming agent flow at the same time into the cavity 6 of the mold 5 (FIG. 8). It may be advantageous to regulate the velocities of flow of the nonfoaming plastics strands 42, 44 so that they are slightly greater than the velocity of flow of the plastic strand 43 containing the foaming agent, so that there may develop with certainty a compact layer of nonfoaming plastic at the surface of the cavity 6 lying opposite the sprue runner 4 (FIG. 9). In this case, as soon as there has accumulated in the cavity 6 of the mold 5 a sufficient amount of nonfoaming plastic and of a plastic containing foaming agent, the nozzles 20, 32, 41 are closed through an appropriate energization of the drives 19, 31, 40. Also, in this case the raising agent causes an apparent dilation of the mass of plastics that entered through the inner ring nozzle 32, so that the cavity 6 becomes completely filled (FIGS. 10 and 11).

The molded component that has been manufactured in this manner still has foamed plastic present in the region of the sprue runner 4. After the sprue has been removed, for this reason, there exists in the unfoamed plastic layer a visible, circular surface of foamy structure. In the event that there should also exist at the separation site of the sprue a surface of unfoamed plastic, then the outer sleeve 10 or the closing pin 34 can be closed with a time lag, so that a small amount of nonfoaming plastic may still flow into the sprue runner 4 and there displace the foamed plastic. This procedure is particularly applicable if the side of the molded body which faces the sprue is used as the so-called "visual" side.

A modified form of the above-described illustrated embodiment is also possible by providing in the closing pin 34 a central channel, not shown, through which a gaseous medium, such as air, may be blown into the cavity 6 of the mold 5. The finished molded body then has a cavity that is surrounded by a three-layer jacket. In that way, if the strength permits, it is possible to achieve a considerable saving in weight. It is also possible to join the injection head 1 to the cavity 6 of the mold 5 in such a way that molded bodies without a sprue may be formed. Depending on the nature of the molded body to be made, it is possible to use different materials for the plastic strands flowing through the outer ring nozzle 20 and the central nozzle 41. These may differ, for example, in their composition or in their color. This necessitates, however, that the outer ring nozzle 20 and the central nozzle 41 be served through separate channels from separate injection cylinders.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:

1. Apparatus for the injection molding of multilayer bodies of thermoplastic, comprised of
   a. a nozzle having a peripheral edge defining a central opening (7) adapted to be placed in communication with the sprue of a mold, the opening having an axis,
   b. an outer sleeve (11) mounted within the edge for movement along the axis to form with the peripheral edge an outer ring nozzle (20), the sleeve shape conforming to the peripheral edge to allow sealing of the outer ring nozzle when the outer sleeve is in a closed position with respect to the edge and opening of the outer ring nozzle when the outer sleeve is in an open position with respect to the edge,
   c. an inner sleeve (25) mounted within the outer sleeve for movement along the axis to form with the outer sleeve an inner ring nozzle, the inner sleeve shape-conforming to the outer sleeve to allow sealing of the inner ring nozzle when the inner sleeve is in a closed position with respect to the outer sleeve and opening of the inner ring nozzle when the inner sleeve is in an open position with respect to the outer sleeve,
   d. a pin (34) mounted within the inner sleeve for movement along the axis to form with the inner sleeve a central nozzle, this pin shape-conforming to the inner sleeve to allow sealing of the central nozzle when the pin is in a closed position with respect to the inner sleeve and opening of the central nozzle when the pin is in an open position with respect to the inner sleeve,
   e. a first source of fluid thermoplastic of a first type,
   f. a second source, distinct from the first source, of fluid thermoplastic of a second type, g. a first conduit which carries thermoplastic from the first source to the outer ring nozzle and central nozzle,
h. a second conduit which carries thermoplastic from the second source to the inner ring nozzle, the conduits being separate so that there is no intermixing of the thermoplastics of the first and second type prior to reaching the nozzles,
i. a drive actuator connected to the edge, sleeves, and pin and adapted to selectively cause the edge, sleeves, and pin to move with respect to one another.

2. Apparatus as recited in claim 1, wherein at least one of the conduits includes a helical channel.

* * * * *

UNITED STATES PATENT AND TRADEMARK OFFICE
CERTIFICATE OF CORRECTION

PATENT NO. : 3,947,177
DATED : March 30, 1976
INVENTOR(S) : Helmut Eckardt

It is certified that error appears in the above-identified patent and that said Letters Patent are hereby corrected as shown below:

Column 1, line 6, the German patent number reading "DT-AS 1,778,451" should read --- DT-AS 1,778,457 ---

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*